United States Patent
Reju et al.

(10) Patent No.: US 11,363,120 B2
(45) Date of Patent: Jun. 14, 2022

(54) METHOD FOR RUNNING AN APPLICATION ON A DISTRIBUTED SYSTEM ARCHITECTURE

(71) Applicant: VOLKSWAGEN AKTIENGESELLSCHAFT, Wolfsburg (DE)

(72) Inventors: Jithin Reju, Dortmund (DE); Rolf Schuster, Neuss (DE); Wolfgang Theimer, Bochum (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 15/930,087

(22) Filed: May 12, 2020

(65) Prior Publication Data

US 2020/0366760 A1 Nov. 19, 2020

(30) Foreign Application Priority Data

May 13, 2019 (DE) ...................... 10 2019 206 923.1

(51) Int. Cl.
*H04L 67/01* (2022.01)
*G06F 9/54* (2006.01)
(Continued)

(52) U.S. Cl.
CPC .............. *H04L 67/42* (2013.01); *G06F 9/547* (2013.01); *H04L 47/283* (2013.01);
(Continued)

(58) Field of Classification Search
CPC ................. H04L 67/42; H04L 67/1008; H04L 47/283; H04L 67/1002; H04L 69/329;
(Continued)

(56) References Cited

U.S. PATENT DOCUMENTS

| | | | | |
|---|---|---|---|---|
| 6,026,425 A | * | 2/2000 | Suguri | .................. G06F 9/5083 709/223 |
| 7,707,288 B2 | * | 4/2010 | Dawson | ................ G06F 9/5072 709/224 |

(Continued)

FOREIGN PATENT DOCUMENTS

| | | |
|---|---|---|
| EP | 3425873 A1 | 1/2019 |
| JP | 2008009865 A | 1/2008 |

OTHER PUBLICATIONS

Qin et al.; Communication-Aware Load Balancing for Parallel Applications on Clusters; IEEE Transactions on Computers; Jan. 2010; pp. 42-52; vol. 59, No. 1.

*Primary Examiner* — Ramy M Osman
(74) *Attorney, Agent, or Firm* — Barnes & Thornburg, LLP

(57) ABSTRACT

A method for executing an application on a distributed system architecture having an application client for receiving input data and for providing output data; a local application server on the application client; at least one remote application server for receiving input data from the application client for processing input data for the application client and for returning processed input data to the application client; and an application manager for assigning the application to the local application server or to the at least one remote application server. The method includes determining a first round-trip time, determining a second round-trip time, determining a tolerance time for receiving and processing input data for the application, comparing the two round-trip times with the tolerance time, and assigning the application to the local application server or to the at least one remote application server based on the comparison.

17 Claims, 2 Drawing Sheets

(51) Int. Cl.
*H04L 47/283* (2022.01)
*H04L 67/1001* (2022.01)
*H04L 69/329* (2022.01)
*H04L 67/1008* (2022.01)

(52) U.S. Cl.
CPC ...... *H04L 67/1002* (2013.01); *H04L 67/1008* (2013.01); *H04L 69/329* (2013.01)

(58) Field of Classification Search
CPC ..... H04L 67/12; H04L 67/1004; H04L 67/10; H04L 67/025; H04L 67/1097; G06F 9/547; G06F 9/5072; G06F 2209/502
See application file for complete search history.

(56) References Cited

U.S. PATENT DOCUMENTS

| | | | |
|---|---|---|---|
| 10,291,494 B2* | 5/2019 | Nedeltchev | H04L 43/04 |
| 10,666,534 B2* | 5/2020 | Singhal | H04L 67/42 |
| 10,776,236 B1* | 9/2020 | Kudrin | H04L 67/025 |
| 2004/0049579 A1* | 3/2004 | Ims | H04L 67/2823 709/225 |
| 2004/0199918 A1* | 10/2004 | Skovira | H04L 67/325 718/102 |
| 2005/0114141 A1* | 5/2005 | Grody | G10L 15/30 704/270 |
| 2007/0104118 A1* | 5/2007 | Mega | H04L 69/04 370/254 |
| 2009/0327495 A1* | 12/2009 | Betts-LaCroix | H04L 67/10 709/226 |
| 2013/0205158 A1 | 8/2013 | Lin et al. | |
| 2014/0095695 A1 | 4/2014 | Wang et al. | |
| 2014/0222896 A1 | 8/2014 | Okuno | |
| 2015/0006620 A1* | 1/2015 | Joseph | H04L 67/10 709/203 |
| 2015/0161755 A1* | 6/2015 | Jang | G06T 1/20 345/503 |
| 2015/0178086 A1* | 6/2015 | Hughes | G06F 9/3004 711/125 |
| 2016/0077901 A1* | 3/2016 | Roth | H04L 67/42 719/328 |
| 2016/0150517 A1 | 5/2016 | Wang et al. | |
| 2018/0234922 A1* | 8/2018 | Meredith | H04L 67/10 |
| 2019/0197339 A1* | 6/2019 | Han | G06K 9/4604 |
| 2020/0106714 A1* | 4/2020 | Cote | H04L 41/0816 |
| 2020/0195731 A1* | 6/2020 | Guo | H04L 67/34 |
| 2020/0366760 A1* | 11/2020 | Reju | H04L 47/283 |
| 2021/0182118 A1* | 6/2021 | Sahin | G06F 9/5083 |

* cited by examiner

METHOD FOR RUNNING AN APPLICATION ON A DISTRIBUTED SYSTEM ARCHITECTURE

PRIORITY CLAIM

This patent application claims priority to German Patent Application No. 10 2019 206 923.1, filed 13 May 2019, the disclosure of which is incorporated herein by reference in its entirety.

SUMMARY

Illustrative embodiments relate to a method for executing an application on a distributed system architecture and to a corresponding distributed system architecture.

BRIEF DESCRIPTION OF THE DRAWINGS

Disclosed embodiments are described in more detail below with reference to the figures. In this case, disclosed embodiments are essential individually or in any desired combination. In this case, it should be noted that the figures have only a descriptive character and are not intended to restrict the disclosed embodiments. In the figures.

DETAILED DESCRIPTION

Figure 1:
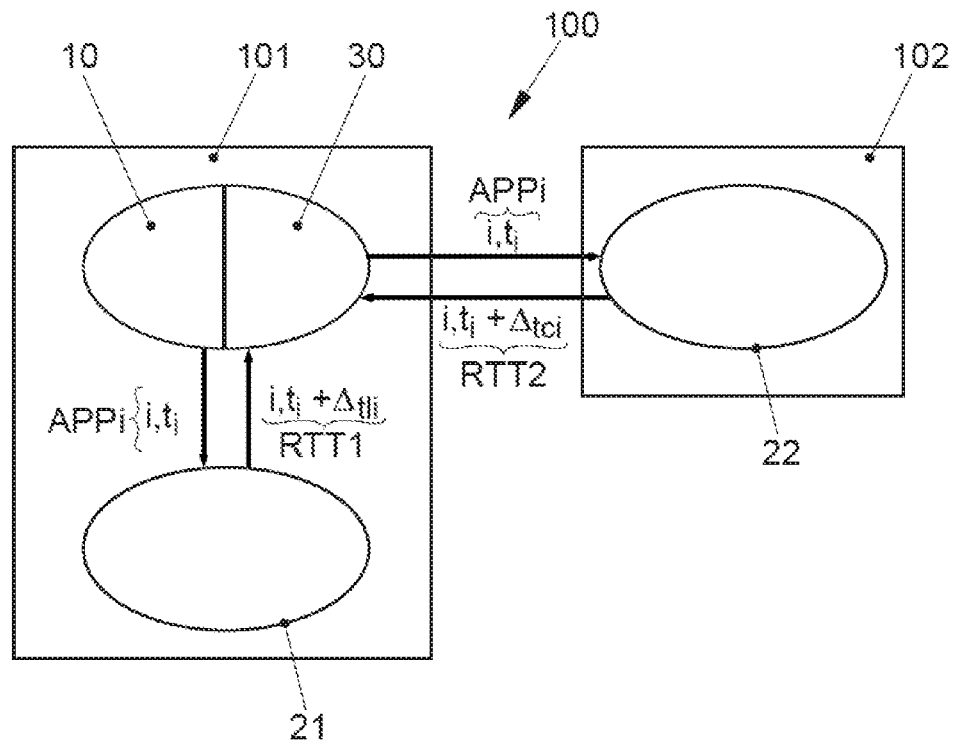
FIG. 1 shows a schematic illustration of a distributed system architecture.

With the emergence of mobile communication and cloud computing, it is no longer necessary for data for applications to be processed on a mobile device itself, for example, a transportation vehicle or another user apparatus. On account of the higher computing power, it may be beneficial to use remote resources, for example, cloud resources and/or edge cloud resources, to process data even if the communication with the remote resources requires time and energy. In this case, the user must decide whether the local computing on the mobile device itself, for example, in a transportation vehicle, is used or whether the calculation is carried out on a mobile edge server in the vicinity of the mobile device or in a cloud computing center further away from the mobile device. This decision should be made as automatically as possible to avoid adversely affecting the user comfort. In addition, in the case of mobile devices, a transfer between the adjacent edge servers must be carried out as automatically as possible during the movement of the mobile devices.

The integration of networks into cluster environments is generally known from the document Xiao Qin et al.: "Communication-Aware Load Balancing for Parallel Applications on Clusters", In: IEEE Transactions on Computers, Vol. 59, January 2010, pp. 42-52.

According to their prioritization, applications are currently assigned either to a local application server or to a remote application server, as shown, by way of example, by the document EP 3 425 873 A1. In this case, applications are classified as time-critical or normal. According to the prioritization, they are permanently assigned to the local or remote application server. However, such an assignment is rigid and inflexible, which may result in losses in comfort in mobile applications.

The disclosed embodiments provide an improved method for executing an application on a distributed system architecture. In particular, the disclosed embodiments provide a method for executing an application on a distributed system architecture, which method makes it possible to assign applications to available resources within the distributed system architecture in a flexible, adaptable and convenient manner. The disclosed embodiments also provide a corresponding distributed system architecture.

This is achieved by a method for executing an application on a distributed system architecture and a corresponding distributed system architecture. Features which are disclosed with respect to the individual embodiments can be combined with one another such that reference is or can always be reciprocally made with respect to the disclosed embodiments.

The disclosed embodiments provide a method for executing an application on a distributed system architecture having:

an application client, in particular, a mobile application client (for example, in a user apparatus, for example, in a mobile device, a mobile telephone, a smartphone, a laptop, a vehicle control unit, a navigation unit, an infotainment system etc.), for receiving input data (for example, sensor data) and for providing output data (for example, actuator settings) on the basis of processed input data, a local application server (local computing unit) on the application client and at least one remote application server (cloud server and one or more edge cloud servers) for receiving input data from the application client, for processing input data for the application client and for returning processed input data to the application client, and an application manager (local control unit) for assigning the application (or at least one computing task for processing input data for the application) to the local application server or to the at least one remote application server.

For this purpose, the disclosed embodiments for the method have the following operations of:

determining a first round-trip time for receiving and processing input data on the local application server (and possibly for returning processed input data to the application client), determining a second round-trip time for receiving and processing input data on the at least one remote application server (and possibly for returning processed input data to the application client), determining a tolerance time, in particular, a maximum permissible tolerance time, for receiving and processing input data for the application (and possibly for returning processed input data to the application client), comparing the first round-trip time and the second round-trip time with the tolerance time, assigning the application to the local application server or to the at least one remote application server on the basis of the comparison.

In this case, the disclosed embodiments recognize that all applications are different. They have different speeds and different (permissible and/or tolerable) response times depending on the type of required processing or calculation. The disclosed embodiments apply to all areas in which the locally available computing resources are limited. Some of the applications comprise automotive applications, drones, cognitive applications etc. The results of the processing on remote application servers, for example, on a central cloud server and/or on one or more edge cloud servers, are fundamentally better than those of the local calculation since the hardware resources on remote application servers are better, in which case the local computing resources are usually limited.

In this case, the concept of the disclosed embodiments lies in the fact that it is possible, for all types of applications, to use a tolerance time for receiving and processing input data or, in other words, a latency threshold value or a round-trip time (RTT) as a transfer criterion to select the most efficient calculation environment for the specific application. The tolerance time or the round-trip time is the period from when the local device (that is to say the application client) transmits a request, comprising sensor raw data (that is to say input data), to an available application server (local or remote) to the reception of the calculated results from the application server. The tolerance time or the round-trip time therefore comprises the waiting time (so-called latency) and the computing time on the available application server. It is not necessary to explicitly consider the throughput within the network so that the transfer decision can be made, since this information is already represented in the tolerance time. The tolerance time or the round-trip time is a simple individual parameter which can be set by the developer when developing an application. It is possible to set the tolerance time or the round-trip time as a static or adaptive threshold value, to which reference is specifically made below. The dynamics of the application can be measured once before the start and/or during the runtime of the application, whereupon the tolerance time can be adaptively changed. Slow changes in the application can result in high threshold values, whereas fast changes in the application can result in lower threshold values. The user's experience and/or the quality criteria defined by the application can also be taken into account when determining the tolerance time.

The distributed system architecture is based on three pillars:

the application client functions as a front-end. It reads input data (for example, sensor information) and provides output data (for example, actuator outputs).

In this case, the application client can be considered to be a human-machine interface (HMI). The application client has a locally available computing device (local application server) on which the application can run.

The application server (local or remote) is a computing module for processing input data (for example, from sensors) and for outputting processed input data, for example, as output data (for example, actuating values for corresponding actuators).

The application server can be provided locally where the application client is situated. It may also be shifted to an edge cloud server or to a larger computing center in the cloud. The application server may have at least one local application server and a plurality of remote application servers. The plurality of remote application servers may in turn comprise a plurality of (even changing) edge cloud servers and at least one central cloud server.

The application manager is a unit which decides, on the basis of the disclosed rules or the disclosed method, where the input data are processed.

Furthermore, in a method for executing an application on a distributed system architecture, the disclosed embodiments may provide for the application to be assigned to the local application server if the first round-trip time is below the tolerance time. The application can be successfully executed directly on the local application server if the first round-trip time does not exceed the tolerance time.

Furthermore, in a method for executing an application on a distributed system architecture, the disclosed embodiments can provide for the application to be assigned to the at least one remote application server if the second round-trip time is below the tolerance time. In this case, the application can be assigned to the at least one remote application server if the necessary waiting time and the processing time on the at least one remote application server do not exceed the tolerance time within the scope of the second round-trip time.

Furthermore, in a method for executing an application on a distributed system architecture, the disclosed embodiments can provide for the application to be assigned to the local application server or to the at least one remote application server on the basis of at least one condition if the first round-trip time and the second round-trip time are below the tolerance time. The condition can be used to carry out an assignment in cases in which both application servers or a plurality of application servers can provide the processed input data within the tolerance time.

It is also conceivable for the at least one condition to be able to comprise at least one following item of information, such as: user preferences, experience data and/or application performance. For example, it is conceivable that the remote (edge) cloud solution may be preferred if both application servers or a plurality of application servers can provide the processed input data within the tolerance time.

It is also possible for the tolerance time to comprise a static threshold value. The tolerance time can therefore be determined once and/or with little effort, for example, by an application developer.

The disclosed embodiments can also provide for the static threshold value to be determined as a mean value of the first round-trip time and the second round-trip time for a multiplicity of requests to process input data. A plausible threshold value for determining the tolerance time can therefore be calculated from a multiplicity of requests.

It is also conceivable for the static threshold value to be determined by measuring the distributed system architecture. A plausible threshold value for determining the tolerance time can therefore be calculated for the respective distributed system architecture even if the measurement is carried out only once.

It is also conceivable for the dynamics of output data to be taken into account when determining the static threshold value. In this case, the dynamics of output data can be examined within (only) a tolerance time to take into account a functional averaging of output data.

It is also conceivable for the static threshold value to be determined once for the application. In this manner, the computing complexity for determining the tolerance time can be kept low.

It is also possible for the tolerance time to comprise an adaptive threshold value, in particular, a time-dependent threshold value. This makes it possible to automatically update the tolerance time on the basis of current events which can comprise changes in the output data and the speed of the change in the output data.

The disclosed embodiments can also provide for the dynamics of output data to be taken into account when determining the adaptive threshold value. The speed of the change in the output data can therefore be taken into account. The disclosed embodiments can therefore take into account the fact that slow changes in the application can result in high threshold values and fast changes in the application can result in lower threshold values.

It is also conceivable for the adaptive threshold value to be dynamically adapted when executing the application. The adaptive threshold value can therefore be regularly updated over time.

In a method for executing an application on a distributed system architecture, the disclosed embodiments can also provide for an adaptive threshold value to be taken into account within the scope of the tolerance time when assigning the application to the local application server or to the at least one remote application server if the application is a dynamic application and/or if the output data change more quickly than a particular threshold value. The threshold value can be used to stipulate a simple rule for when the adaptive threshold value is preferred or as of when the speed of the change in the output value is high enough for the calculation of the adaptive threshold value to be worthwhile.

In a method for executing an application on a distributed system architecture, the disclosed embodiments can also provide for a static threshold value to be taken into account within the scope of the tolerance time when assigning the application to the local application server or to the at least one remote application server if the application is a static application or an application which changes substantially slowly and/or if the output data change more slowly than a particular threshold value. In the case of rather slowly changing applications, the computing capacity for determining the tolerance time can therefore be reduced.

The disclosed embodiments also provide a distributed system architecture having: an application client, in particular, a mobile application client, for receiving input data and for providing output data on the basis of processed input data, a local application server on the application client and at least one remote application server for receiving input data from the application client, for processing input data for the application client and for returning processed input data to the application client, and an application manager for assigning an application to the local application server or to the at least one remote application server. For this purpose, the disclosed embodiments provide for the application manager to be configured:
- to determine a first round-trip time for receiving and processing input data on the local application server,
- to determine a second round-trip for receiving and processing input data on the at least one remote application server,
- to determine a tolerance time for receiving and processing input data for the application,
- to compare the first round-trip time and the second round-trip time with the tolerance time,
- to assign the application to the local application server or to the at least one remote application server on the basis of the comparison.

The same benefits as those described above in connection with the disclosed method are achieved with the aid of the disclosed distributed system architecture. Reference is fully made to these features in the present case.

The application manager can be specifically designed to completely or partially carry out a method which can run as described above.

It is conceivable for the application client to be provided in a user apparatus, a mobile device, a smartphone, a laptop and/or a transportation vehicle.

In the following figures, the identical reference signs are used for the same technical features even of different exemplary embodiments.

FIG. 1 shows an exemplary distributed system architecture 100. The distributed system architecture 100 has the following three elements:
- an application client 10, in particular, a mobile application client 10 (for example, in a user apparatus 101, for example, in a mobile device, a mobile telephone, a smartphone, a laptop, a vehicle control unit, a navigation unit, an infotainment system etc.), for receiving input data (for example, sensor data) and for providing output data f(t) (for example, actuator settings) on the basis of processed input data,
- a local application server 21 (local computing unit) on the application client 10 and at least one remote application server 22 (cloud server and one or more edge cloud servers) for receiving input data from the application client 10, for processing input data for the application client 10 and for returning processed input data to the application client 10, and
- an application manager 30 (local control unit) for assigning an application APP to the local application server 21 or to the at least one remote application server 22.

The disclosed embodiments provide a method for executing an application APP on a distributed system architecture 100 according to FIG. 1, which method has the following operations of:
- determining a first round-trip time RTT1 for receiving and processing input data on the local application server 21,
- determining a second round-trip time RTT2 for receiving and processing input data on the at least one remote application server 22,
- determining a tolerance time $\Delta t_{max}$, in particular, a maximum permissible tolerance time $\Delta t_{max}$, for receiving and processing input data for the application APP,
- comparing the first round-trip time RTT1 and the second round-trip time RTT2 with the tolerance time $\Delta t_{max}$,
- assigning the application APP (or at least one computing task for processing input data for the application APP) to the local application server 21 or to the at least one remote application server 22 on the basis of the comparison.

The application manager 30 is designed to carry out the disclosed method.

The local application server 21 may be on the application client 10, in particular, inside the user apparatus 101.

It may also be shifted to an edge cloud server or to a larger computing center in the cloud. FIG. 1 shows the communication between an application client and manager and the application server which can be executed locally or in the cloud.

The edge infrastructure 102 may have the at least one remote application server 22 comprising a central cloud server and one or more edge cloud servers.

As shown in FIG. 1, the input data transmitted by the application client 10 to the local application server 21 and to the at least one remote application server 22 are consecutively numbered with an index i as raw data. This index is transmitted, together with the actual input data, to the respective application server 21, 22 and is also added to the response from the respective application server 21, 22. This mechanism ensures that the application client 10 can compare the response times $\Delta t_{ci}$, $\Delta t_{li}$ of different application servers 21, 22 for the same input.

The application client 10 can measure and compare the round-trip times RTT1, RTT2 of the local application server 21 $(t_i + \Delta t_{li})$ and of the remote application server 22 in the (edge) cloud $(t_i + \Delta t_{ci})$.

Each application has a particular time limit, namely the tolerance time Δtmax, which indicates when the processing of the input data on the respective application server 21, 22 must be completed by the latest so that this application server 21, 22 is possible for executing a computing task for the application APP.

Figure 2:
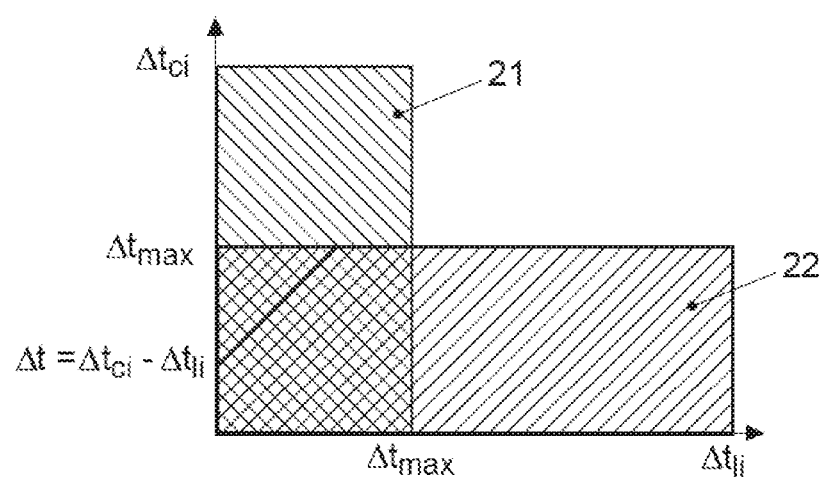
FIG. 2 shows a graph for comparing a first round-trip time and a second round-trip time with a tolerance time.

In FIG. 2, the round-trip times RTT1, RTT2 for a computing task with the index number i from the local response time Δtli or the (edge) cloud response time Δtci are compared with the tolerance time Δtmax. In this case, the round-trip times RTT1, RTT2 contain the communication delay and the computing time on the respective application server 21, 22.

If both response times Δtli, Δtci are below the tolerance time Δtmax, the application manager 30 can freely select both run-time environments or both application servers 21, 22.

At least one condition could also be provided, on the basis of which one application server or the other 21, 22 is preferred. For example, the at least one condition may provide for the at least one remote application server 22 (cloud server or edge cloud server) to be used if the first round-trip time RTT1 and the second round-trip time RTT2 are below the tolerance time Δtmax. It is also conceivable for the at least one condition to be able to comprise at least one following item of information, for example: user preferences, experience data and/or application performance q(Δtruntime).

For example, in the situation according to FIG. 1, the at least one condition can provide for the at least one remote application server 22 to be preferred if the second round-trip time RTT2 (or remote response time) is not longer than the first round-trip time RTT1 (or local response time). In principle, local computing on the local application server 21 is the only sensible choice if the remote response time exceeds the tolerance time Δtmax. Likewise, only remote computing on the at least one remote application server 22 is possible if the local response time is longer than the tolerance time Δtmax. If both round-trip times RTT1, RTT2 are longer than the tolerance time Δtmax, the computing task for the application APP cannot be undertaken in real time.

The concept according to the disclosed embodiments involves using the tolerance time Δtmax and comparing it with the round-trip times RTT1, RTT2. A decision to use the respective application server 21, 22 is made on the basis of this.

The tolerance time Δtmax can comprise a static threshold value. The methods for calculating the static threshold value of the tolerance time Δtmax are explained below.

The first method for calculating the static threshold value can be implemented when the distributed system architecture 100, comprising the local application server 21 and the edge infrastructure 102, is available to the developer for measurement. In this method, the application APP is executed twice, after its development, on this distributed system architecture 100 for a defined sequence of input data. In the first run, the application calculation is carried out completely on the user apparatus 101 and the edge infrastructure 102 is not used. In the second run, the application calculation is carried out in the edge infrastructure 102 and the computing resources of the user apparatus 101 are not used. In both passes, the same sequence of input data is used. The round-trip times RTT1, RTT2 of the input data are averaged for a multiplicity of requests for both runs. This value is then defined as a static threshold value of the tolerance time Δtmax. The equation is represented as follows:

$$\Delta t_{max} = \frac{1}{2N} \sum_{i=0}^{N} (\Delta t_{ci} + \Delta t_{li}).$$

In this case, N is the number of requests transmitted to the application servers 21, 22 in the sequence.

The above method is a reliable approach for determining the static threshold value since it is based on the actual round-trip times RTT1, RTT2 recorded by the distributed system architecture 100.

However, another method could be preferred if the developer does not have access to the distributed system architecture 100.

A second method could be based on the principle of the dynamics of the underlying application APP. Without restricting the applicability, one or more key parameters of the application APP are described as a function f(t) of the time t and represent the output data f(t). The faster this function f(t) changes, the shorter the tolerable round-trip time RTT1, RTT2. In this case, the application developer can specify a maximum tolerable deviation as a threshold value Δfmax of this function f(t), which determines the tolerable value of the tolerance time Δtmax. A static threshold value of Δtmax can then be calculated as represented in the following equation:

$$\Delta t_{max} = (k/|\dot{f}_{mean}|).$$

In this case, k is a constant and indicates the maximum permissible deviation of the application APP in comparison with the baseline specified by the developer. The application APP calculates a function f(t), the dynamics of which can be estimated by its derivative $\dot{f}(t)$. $\dot{f}_{mean}$ is the mean value of the rate of change of the application function f(t). The baseline is the output sequence which should be provided by the application APP for the provided input registration sequence in an ideal scenario (no network latency, computing delays etc.). The second method is easier for a developer since he does not have to have access to the edge infrastructure 102 for the parameter values.

The disclosed embodiments can also provide for the tolerance time Δtmax to be able to comprise an adaptive threshold value, in particular, a time-dependent threshold value.

For some applications APP, the maximum permissible tolerance time Δtmax may be static. In many cases, the maximum permissible tolerance time Δtmax is not static and varies as a function of the time t. In these cases, automatic or adaptive adaptation of the tolerance time Δtmax may be beneficial. If an application APP is described as a function f(t) of the time t, its dynamics are represented by its derivative $\dot{f}(t)$. If the function f(t) varies slowly (that is to say the first derivative $\dot{f}(t)$ is virtually zero), a slow response from the respective application server 21, 22 also suffices to follow the function f(t) within a particular error limit. In this case, the application developer can define a tolerable deviation Δfmax of the function f(t) which must not be exceeded if the respective application server 21, 22 introduces a round-trip time delay. The relationship between the maximum permissible change Δfmax in the function f(t) and the corresponding maximum permissible tolerance time Δtmax as a response time results from the following equation:

$$\Delta f_{max} = |\dot{f}_{mean}| \Delta t_{max}.$$

Figure 3:
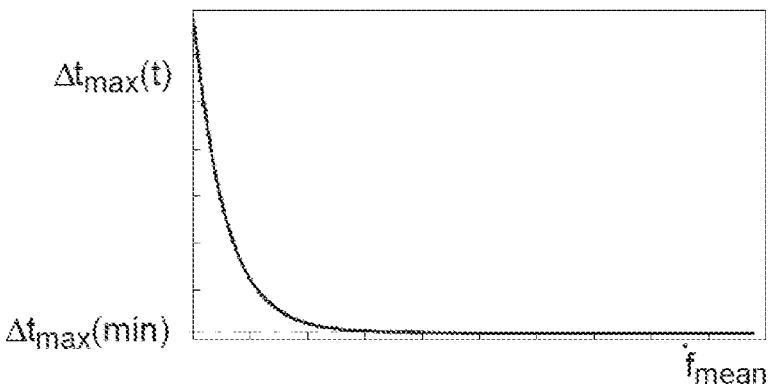
FIG. 3 shows a dependence between an averaged speed of the change in the output data and the tolerance time.

See FIG. 3 in this respect.

Figure 4:
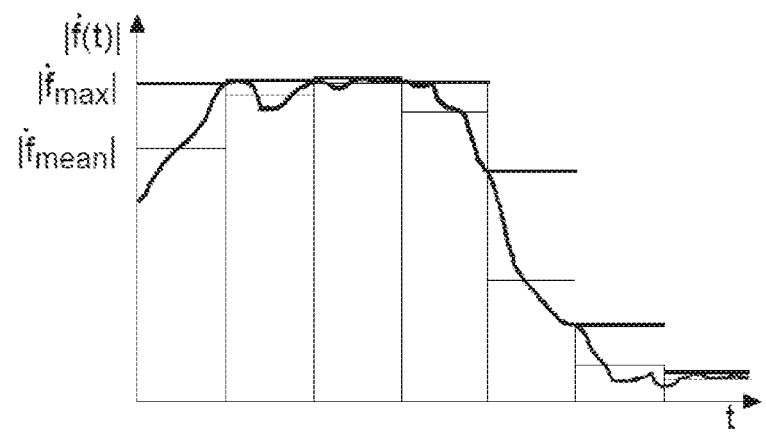
FIG. 4 shows a speed of the change in the output data based on the time.

FIG. 4 also shows how the mean value of the derivative $\dot{f}(t)$ is in the interval of the length Δtmax between the request and the response. The mean value $\dot{f}_{mean}$ of the rate of change of the application function f(t) can be approximated by measurements from a longer interval and can be adapted using a sliding average approach. The adaptive threshold value of the tolerance time Δtmax(t) can be calculated as:

$$\Delta t_{max}(t) \times \Delta f_{max} / |\dot{f}_{mean}(t)|.$$

Within the scope of the disclosure, the minimum rate of change determines a maximum permissible response time (cf. FIG. 3). The value of Δtmax(t) is limited to a maximum value which is based on a minimum value permissible for the mean value $\dot{f}_{mean}$ (cf. FIG. 4). A practical example of an application APP or a function f(t), which is not only a scalar function but may also be a vector function, may be the tracking of vehicle objects in a driver assistance system. For the tracking, a maximum tolerance distance between a tracked object and the transportation vehicle will be specified. The deviation is then converted into a maximum tolerable round-trip time to keep the error within the permissible limits.

Figure 5:
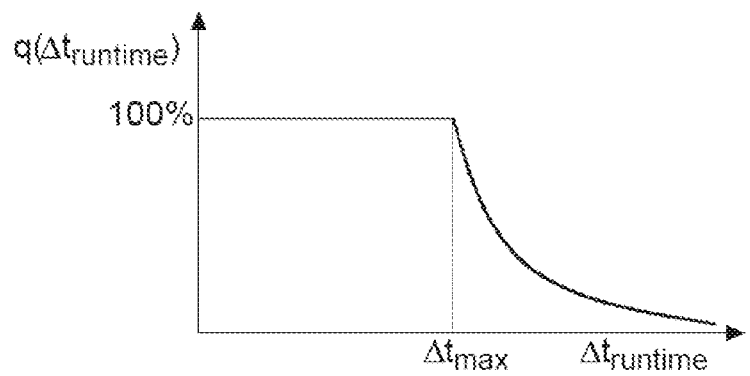
FIG. 5 shows an application performance based on the round-trip time.

An overall measure of quality for the application performance is the application performance q(Δtruntime), for example, how well an object can be tracked in the previous example. It can be created by mapping the actual round-trip time RTT1, RTT2 (referred to as Δtruntime in the example in FIG. 5) from the selected runtime environment (user apparatus 101 and the edge infrastructure 102) to a quality value of between 0% and 100%, as can be seen in FIG. 5. The performance quality for a window of N+1 measurements, which extends from the time t(n-N) to the current time tn, can be calculated as an average of all individual measurements:

$$Q(t_n) = \frac{1}{N+1} \sum_{i=n-N}^{n} q(\Delta t_{runtime}(t_i)).$$

In summary, the disclosed embodiments provide several benefits:

The use of the tolerance time Δtmax for the round-trip time RTT1, RTT2 as the only parameter for deciding which application server 21, 22 is used considerably facilitates the life of a developer. In this case, the developer needs to set only a single parameter.

According to a static approach, the round-trip time RTT1, RTT2 is compared with a static threshold value of the tolerance time Δtmax to decide between the application servers 21, 22, whereas, in the adaptive approach, the round-trip time RTT1, RTT2 is compared with a dynamic threshold value of the tolerance time Δtmax to decide between the application servers 21, 22.

The adaptive approach is more effective than the static approach if the correct values for the maximum tolerable deviation are selected as the threshold value Δfmax. The deviations are reduced and the utilization of the edge infrastructure 102 is simultaneously increased in the case of the adaptation.

If the values of Δfmax are less than a minimum threshold value, the static approach is better than the adaptive approach with respect to deviations and utilization of the edge infrastructure 102. The choice of the adaptive approach should therefore be application-specific and should depend on the application deviation Δfmax allowed by the developer.

The above description of the figures describes the present disclosure solely within the scope of examples. It goes without saying that individual features of the embodiments can be freely combined with one another if technically useful without departing from the scope of the disclosure.

LIST OF REFERENCE SIGNS

100 Distributed system architecture
101 User apparatus
102 Edge infrastructure
10 Application client
21 Local application server
22 Remote application server
30 Application manager
APP Application
RTT1 First round-trip time
RTT2 Second round-trip time
i Index, counter
t Time
ti Request time
Δtci Response time
Δtli Response time
Δtmax Tolerance time
Δt
  Time difference
f(t) Function for the output data
$\dot{f}(t)$ Speed of the change in the output data
$\dot{f}_{max}$ Maximum speed
$\dot{f}_{mean}$ Averaged speed
q(Δtruntime) Application performance
Δtruntime Round-trip time
  The invention claimed is:
  1. A distributed system architecture comprising:
    an application client for receiving input data, processing the input data and further providing output data, derived from processing the input data;
    a local application server on the application client;
    at least one remote application server for receiving the input data from the application client, the remote application server processing the input data for the application client and returning the processed input data to the application client; and
    an application manager for assigning an application to the local application server or to the at least one remote application server,
    wherein the application manager:
      determines a first round-trip time for receiving and processing the input data on the local application server, wherein the first round-trip time is a time period from transmission of a request that includes the input data to the local application server to reception of the output data from the local application server by the application client,
      determines a second round-trip time for receiving and processing the input data on the at least one remote application server, wherein the second round-trip time is a time period from transmission of a request that includes the input data to the at least one remote application server to reception of the output data from the at least one remote application server by the application client, determines a tolerance time for receiving and processing the input data for the application, compares the first round-trip time and the second round-trip time with the tolerance time, assigns the application to the local application server or to the at least one remote application server based on the comparison, wherein the assignment assigns the application to the local application server in response to only the first round-trip time being below the tolerance time, assigns the application to the at least one remote application server in response to only the second round-trip time being below the tolerance time, and assigns the application to one of the local application server or the at least one remote application server according to at least one of a user preference, experience data, and application performance in response to both the first round trip time and second round trip time being below the tolerance time.

2. The distributed system architecture of claim 1, wherein the application client is provided in a user apparatus that comprises a mobile device, a smartphone, a laptop and/or a transportation vehicle.

3. The distributed system architecture of claim 1, wherein the tolerance time comprises a static threshold value.

4. The method of claim 3, wherein the static threshold value is determined by at least one of two procedures that include a first procedure wherein the static threshold value is determined as a mean value of the first round-trip time and the second round-trip time for a multiplicity of requests to process input data, and a second procedure wherein the static threshold value is determined by measuring the distributed system architecture.

5. The method of claim 3, wherein the dynamics of output data are taken into account when determining the static threshold value, or the static threshold value is determined once for the application.

6. The distributed system architecture of claim 1, wherein the tolerance time comprises an adaptive threshold value.

7. The distributed system architecture of claim 6, wherein the determination of the adaptive threshold value is performed based on the dynamics of output data the adaptive threshold value is dynamically adapted when executing the application.

8. The distributed system architecture of claim 6, wherein, within the scope of the tolerance time, an adaptive threshold value is taken into when assigning the application:
to the local application server, or
to the at least one remote application server,
wherein the application is assigned in response to at least one of:
the application being a dynamic application, and
the rate of change of the output data exceeding a particular threshold value.

9. The distributed system architecture of claim 6, wherein, within the scope of the tolerance time, a static threshold value is taken into account when assigning the application:
to the local application server, or
to the at least one remote application server,
wherein the application is assigned in response to at least one of:
the application being a static application,
the application being an application which changes minimally across time, and a particular threshold value exceeding the rate of change of the output data.

10. A method for executing an application on a distributed system architecture having:
an application client for receiving input data, processing the input data and providing output data derived from processing the input data;
a local application server on the application client:
at least one remote application server for receiving input data from the application client, the remote application server processing the input data for the application client and for returning the processed input data to the application client; and
an application manager for assigning the application to the local application server or to the at least one remote application server,
wherein the method comprises:
determining a first round-trip time for receiving and processing the input data on the local application server, wherein the first round-trip time is a time period from transmission of a request that includes the input data to the local application server to reception of the output data from the local application server by the application client,
determining a second round-trip time for receiving and processing the input data on the at least one remote application server, wherein the second round-trip time is a time period from transmission of a request that includes the input data to the at least one remote application server to reception of the output data from the at least one remote application server by the application client,
determining a tolerance time for receiving and processing the input data for the application,
comparing the first round-trip time and the second round-trip time with the tolerance time, and
assigning the application to the local application server or to the at least one remote application server based on the comparison, wherein the assignment assigns the application to the local application server in response to only the first round-trip time being below the tolerance time, assigns the application to the at least one remote application server in response to only the second round-trip time being below the tolerance time, and assigns the application to one of the local application server or the at least one remote application server according to at least one of a user preference, experience data, and application performance in response to both the first round trip time and second round trip time being below the tolerance time.

11. The method of claim 10, wherein the tolerance time comprises a static threshold value.

12. The method of claim 11, wherein the static threshold value is determined by at least one of two procedures including a first procedure wherein the static threshold value is determined as a mean value of the first round-trip time and the second round-trip time for a multiplicity of requests to process input data, and a second procedure wherein the static threshold value is determined by measuring the distributed system architecture.

13. The method of claim 11, wherein the dynamics of output data are taken into account when determining the static threshold value, and wherein the static threshold value is determined once for the application.

14. The method of claim 11, wherein, within the scope of the tolerance time, an adaptive threshold value is taken into account when assigning the application:
to the local application server, or
to the at least one remote application server, wherein the application is assigned in response to at least one of:
the application being a dynamic application, and
the rate of change of the output data exceeding a particular threshold value.

15. The method of claim 11, wherein, within the scope of the tolerance time, a static threshold value is taken into account when assigning the application:
to the local application server, or
to the at least one remote application server,
wherein the application is assigned in response to at least one of:
the application being a static application,
the application being an application which changes minimally across time, and a particular threshold value exceeding the rate of change of the output data.

16. The method of claim 10, wherein the tolerance time comprises an adaptive threshold value.

17. The method of claim 16, wherein the determination of the adaptive threshold value is based on the dynamics of output data, and the adaptive threshold value is dynamically adapted when executing the application.

* * * * *